(12) United States Patent
Yang et al.

(10) Patent No.: US 11,816,844 B2
(45) Date of Patent: Nov. 14, 2023

(54) METHOD FOR MEASURING ANGULAR VELOCITY AND ANGULAR ACCELERATION BASED ON MONOCULAR VISION

(71) Applicants: Guizhou University, Guiyang (CN); National Institute of Metrology, China, Beijing (CN)

(72) Inventors: Ming Yang, Guiyang (CN); Chenguang Cai, Beijing (CN); Zhihua Liu, Beijing (CN); Qi Lyu, Beijing (CN); Wenfeng Liu, Guiyang (CN); Ping Yang, Beijing (CN)

(73) Assignees: Guizhou University, Guiyang (CN); National Institute of Metrology, China, Beijing (CN)

( * ) Notice: Subject to any disclaimer, the term of this patent is extended or adjusted under 35 U.S.C. 154(b) by 115 days.

(21) Appl. No.: 17/555,734

(22) Filed: Dec. 20, 2021

(65) Prior Publication Data

US 2022/0114737 A1    Apr. 14, 2022

(30) Foreign Application Priority Data

Nov. 15, 2021   (CN) .......................... 202111348903.5

(51) Int. Cl.
G06T 7/246    (2017.01)
G06T 7/11     (2017.01)
G01P 15/18    (2013.01)

(52) U.S. Cl.
CPC .............. *G06T 7/246* (2017.01); *G01P 15/18* (2013.01); *G06T 7/11* (2017.01); *G06T 2207/30204* (2013.01)

(58) Field of Classification Search
CPC .................................. G06T 7/11; G06T 7/246
See application file for complete search history.

(56) References Cited

FOREIGN PATENT DOCUMENTS

| CN | 101581257 B | 7/2012 |
| CN | 104697525 A | 6/2015 |

*Primary Examiner* — Walter L Lindsay, Jr.
*Assistant Examiner* — Andrew V Do

(57) ABSTRACT

A method for measuring angular velocity and angular acceleration based on monocular vision. Firstly, a movement sequence image of a feature mark fixed on a working table of a rotary motion generating device is acquired via an acquisition and imaging device. Secondly, a region of interest on the movement sequence image of the feature mark under different shooting distances and rotating conditions is determined by cyclic matching between a set of circular templates and the movement sequence image of the feature mark. Then, a sub-pixel of feature line edges in the region of interest is extracted using a line segment detection method, and only the feature line edges in a motion direction are retained through a constraint of the number of edge points. Finally, the angular velocity and angular acceleration are calculated by using the extracted feature line edges in the motion direction.

5 Claims, 2 Drawing Sheets

METHOD FOR MEASURING ANGULAR VELOCITY AND ANGULAR ACCELERATION BASED ON MONOCULAR VISION

CROSS-REFERENCE TO RELATED APPLICATIONS

This application claims the benefit of priority from Chinese Patent Application No. 202111348903.5, filed on Nov. 15, 2021. The content of the aforementioned application, including any intervening amendments thereto, is incorporated herein by reference in its entirety.

TECHNICAL FIELD

This application relates to motion measurement and pose estimation, and more particularly to a method for measuring angular velocity and angular acceleration of a rotary motion based on monocular vision.

BACKGROUND

The measurement of angular velocity and angular acceleration of the rotary motion has been widely used in various fields, such as pose estimation, inertial navigation, angular vibration calibration and rotation speed measurement. The rotary motion is a basic unit of multi-degree-of-freedom motion, and its measurement accuracy is closely related to the performance of practical engineering applications. To satisfy the rapidly-growing demand for high-precision measurement in the engineering applications, it is necessary to improve the measurement accuracy of rotational angular velocity and angular acceleration. Therefore, it is of great importance to develop a high-accuracy method for measuring the angular velocity and angular acceleration of the rotary motion.

At present, the commonly used methods for measuring angular velocity and angular acceleration of the rotary motion include laser interferometry and an inclination sensor-based method. The laser interferometry has the advantages of strong anti-interference ability, good dynamic performance, high angle measurement accuracy, wide frequency range and high linearity, and it can realize the high-precision measurement of angular velocity and angular acceleration within a wide frequency range, and can also achieve the arcsecond level angle measurement. Whereas, the measurement system used in the laser interferometry has high cost, complicated structure, poor flexibility, and cumbersome operation, and thus is not suitable for the large-angle rotary motion measurement. With respect to the inclination sensor-based measurement method, an inclination sensor or a gyroscope is employed to measure the rotation angle, which has a simple measurement system, low cost, simple operation and high efficiency. Unfortunately, the measurement accuracy is relatively poor, usually tens to hundreds of arcseconds. Moreover, the measurement accuracy can only be ensured in a limited frequency range due to the limitations of dynamic characteristics and calibration sensitivity and precision of the sensor. Monocular vision has been increasingly applied to the practical engineering owing to its advantages of excellent portability and flexibility, high precision, and low cost. The existing monocular vision-based method can realize the dynamical measurement of the rotatory angles with an accuracy as high as several arcseconds such that it can be used to enable the high-precision, low-cost and simple measurement of the angular velocity and angular acceleration of the rotatory motion.

Therefore, considering that the existing methods for measuring angular velocity and angular acceleration of the rotary motion have problems of high cost and complexity, and poor flexibility, and can hardly achieve the high-precision measurement of the rotary motion in a wide frequency range, this application provides a monocular vision-based method for measuring angular velocity and angular acceleration of the rotary motion with good precision, low cost, excellent flexibility and high efficiency.

SUMMARY

To solve the defects of complex system, high cost, poor flexibility and limited measurement accuracy in the existing rotation measurement methods, the present disclosure provides a method for measuring angular velocity and angular acceleration based on monocular vision, which is efficient, flexible and accurate.

Technical solutions of this application are described as follows.

This application provides a method for measuring angular velocity and angular acceleration based on monocular vision, comprising:

(S1) fixing a feature mark on a working table of a rotary motion generating device; and acquiring, by an acquisition and imaging device, a movement sequence image of the feature mark; wherein the feature mark is composed of a straight line and four circles therearound; and a rotation characteristic of the feature mark are consistent with that of the working table of the rotary motion generating device;

(S2) determining a region of interest on the movement sequence image of the feature mark by template matching, wherein the region of interest is formed by centers of the four circles of the feature mark; selecting a set of circular templates with different sizes; and subjecting the set of circular templates and the movement sequence image of the feature mark to cyclic matching to determine the region of interest on the movement sequence image of the feature mark acquired under different shooting distances and rotation conditions;

(S3) extracting all feature line edges in the region of interest based on a line segment detection method; retaining coordinates of points at feature line edges in a motion direction via a constraint of the number of edge points; and acquiring a corresponding fitted edge line by least square-based linear fitting; and (S4) calculating an angular velocity and angular acceleration of a rotary motion through the corresponding fitted edge line; and saving and displaying calculation results.

Compared to the prior art, the method provided herein for measuring angular velocity and angular acceleration based on monocular vision has the following advantages.

(1) The method provided herein is stable, reliable and practical, and is suitable for the measurement of angular velocity and angular acceleration of rotary motion in different frequency and angle ranges.

(2) The method provided herein has simple and flexible operation and low cost, and only requires an acquisition and imaging device for the measurement of rotary motion at different frequency ranges.

(3) The method provided herein can realize the high-precision measurement of angular velocity and angular acceleration of rotary motion by the angle measurement of the rotary motion.

(4) The method provided herein can realize the measurement of angular velocity and angular acceleration of the rotary motion generating device in horizontal and vertical directions at a certain frequency range.

(5) The method provided herein converts the measurement of angular velocity and angular acceleration of the rotary motion into the measurement of rotational angle, which is beneficial to the measurement traceability of angular velocity and angular acceleration of the rotary motion based on monocular vision, and provides an effective way for the accurate measurement of six-degree-of-freedom motion.

DETAILED DESCRIPTION OF EMBODIMENTS

To solve the problems of complex system, high cost, poor flexibility, and limited measurement accuracy in the existing measurement methods of rotary motion, the present disclosure provides a method for measuring angular velocity and angular acceleration based on monocular vision. By means of the reliable and precise extraction of feature line edges of a movement sequence image of a feature mark, the method provided herein achieves the high-precision measurement of angular velocity and angular acceleration of the rotary motion in a low-frequency range. The present disclosure will be described in detail below with reference to the drawings and embodiments.

Figure 1:
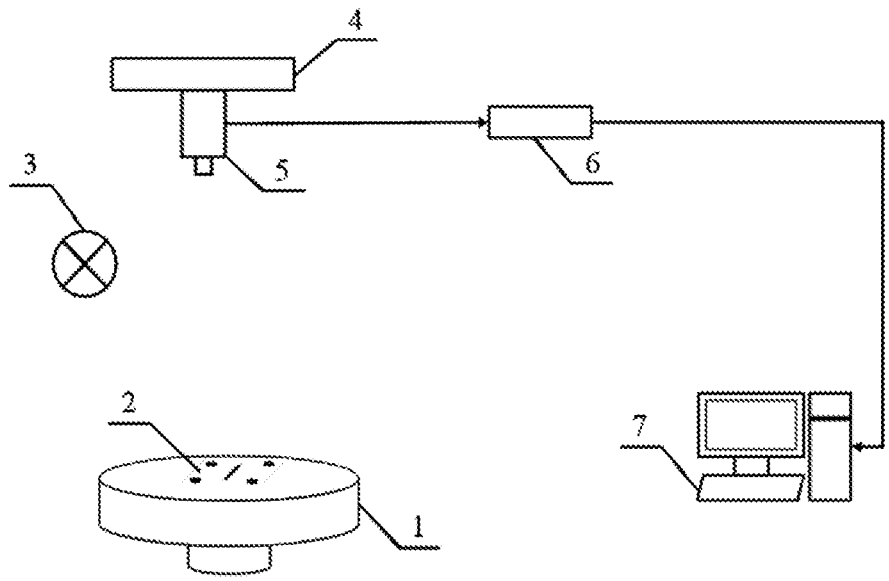
FIG. 1 schematically shows horizontal arrangement of a feature mark and a working table of a rotary motion generating device according to an embodiment of the present disclosure.
Figure 2:
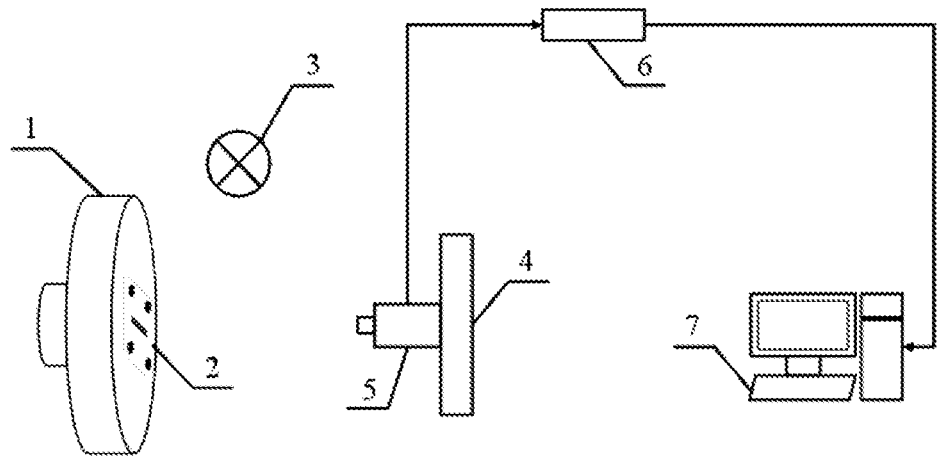
FIG. 2 schematically shows vertical arrangement of the feature mark and the working table of the rotary motion generating device according to an embodiment of the present disclosure.

Referring to FIGS. 1-2, provided herein is an apparatus for implementing the method for measuring angular velocity and angular acceleration based on monocular vision, which includes a working table 1 of a rotary motion generating device, a feature mark 2, a lighting device 3, a fixing part 4 of an acquisition and imaging device, the acquisition and imaging device 5, an image transmission device 6, and an image processing and displaying unit 7. The acquisition and imaging device 5 is connected to the image transmission device 6. The image transmission device 6 is connected to the image processing and displaying unit 7. The working table 1 of the rotary motion generating device is configured to produce a constant-speed or variable-speed rotary motion. The feature mark 2 is fixedly arranged on the working table 1 of the rotary motion generating device such that the rotation characteristic of the feature mark 2 is consistent with that of the working table 1 of the rotary motion generating device. The lighting device 3 is configured to provide light for the acquisition and imaging device 5. The fixing part 4 of the acquisition and imaging device is configured to fix the acquisition and imaging device 5 to allow a light axis of the acquisition and imaging device 5 to be perpendicular to the feature mark 2. The acquisition and imaging device 5 is configured to collect the movement sequence image of the feature mark. The image transmission device 6 is configured to transmit the movement sequence image of the feature mark collected by the acquisition and imaging device 5. The image processing and display unit 7 is configured to process the acquired movement sequence image of the feature mark, and save and display measurement results of the angular velocity and angular acceleration of the rotary motion of the feature mark 2.

Figure 3:
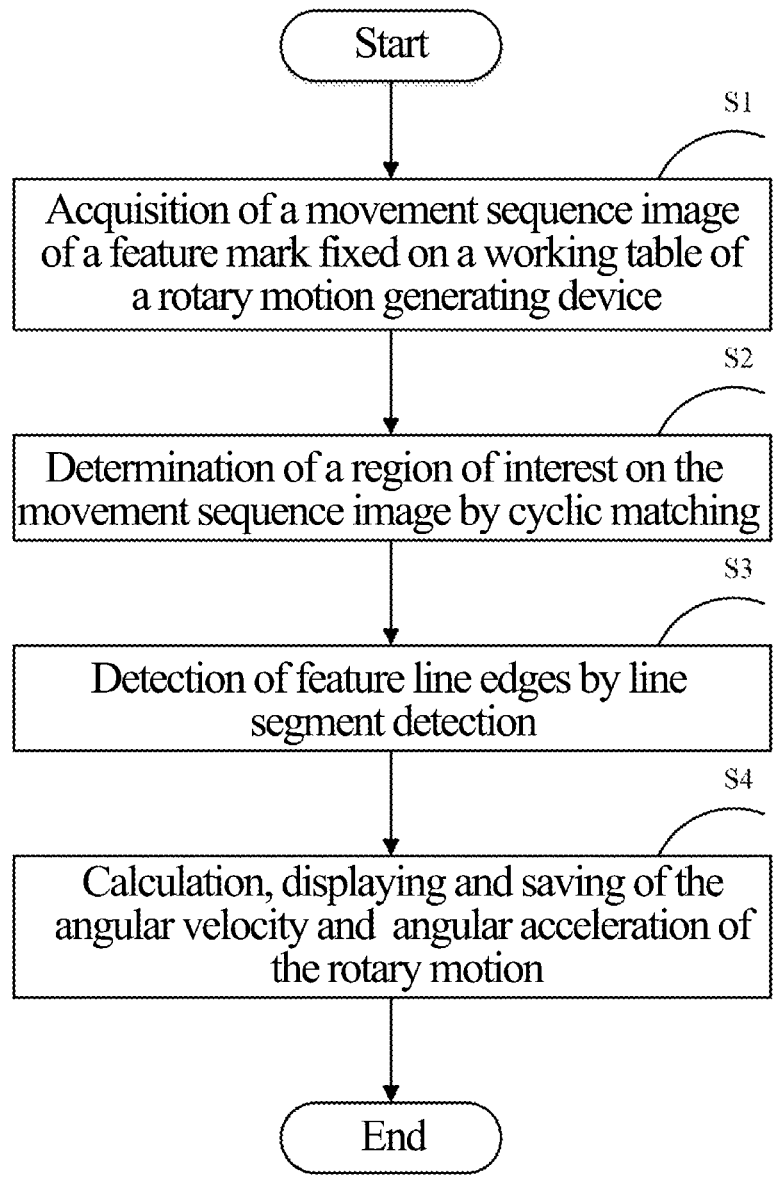
FIG. 3 is a flow chart of a method for measuring angular velocity and angular acceleration based on monocular vision according to an embodiment of the present disclosure.

Referring to FIG. 3, a method for measuring angular velocity and angular acceleration based on monocular vision is provided, which includes the following steps.

(S1) The feature mark 2 is fixed on the working table 1 of the rotary motion generating device. An optical axis of the acquisition and imaging device 5 is perpendicular to the working table 1 of the rotary motion generating device. A movement sequence image of the feature mark 2 with adequate frames is acquired via the acquisition and imaging device 5.

(S2) A region of interest (ROI) on the movement sequence image of the feature mark acquired under different shooting distances and rotation conditions is determined by subjecting a set of circular templates with different sizes and the movement sequence image of the feature mark to cyclic matching four times, where the region of interest is formed by centers of the four circles of the feature mark.

(S3) All feature line edges in the region of interest are detected based on a line segment detection method to eliminate interference from similar edges of the background area. A corresponding fitted edge line is acquired by least square-based linear fitting. Similarly, a fitting edge line of a reference image is obtained by the same method.

(S4) An edge line of the reference image is selected as a reference zero, and a rotational angle between edge lines of the subsequent frames and the edge line of the reference image are respectively calculated to obtain the corresponding angular velocity and angular acceleration.

The specific parameters of the apparatus provided herein are described as follows. The frequency range of the rotary motion generating device is 0.001 10 Hz and the maximum rotational angle of the rotary motion generating device is 360°. The feature mark 2 is a metal plate composed of a straight line and four circles therearound, where the length and width are 60 mm and 0.5 mm, respectively; and a radius of the four circles is 15 mm. An Os10-v3-4k industrial camera with a maximum frame rate of 1000 fps and a maximum resolution of 9 million pixels is implemented in the acquisition and imaging device 5, where the focal length of the KOWA lens is 16 mm. An incandescent lamp of 60 W is implemented in the lighting device 3.

To verify the measurement accuracy of the method provided herein, the measurement of the angular velocity and angular acceleration in the frequency range of 0.001 10 Hz is realized by using the method provided herein. The measurement results of the angular velocity obtained by the monocular vision method and the circular grating method in the frequency range of 0.001 10 Hz are shown in Table 1. The measurement results obtained by the monocular vision-based method are highly matched with those obtained by the circular grating method, and the maximum relative deviation within the whole frequency range is less than 0.3%.

TABLE 1

Measurement results of the angular velocity by using the monocular vision-based method and the circular grating method

| Frequency | Monocular vision method (°/s) | Circular grating method (°/s) | Relative deviation (%) |
|---|---|---|---|
| 0.001 | 0.360 | 0.361 | −0.277 |
| 0.002 | 0.720 | 0.718 | 0.278 |
| 0.005 | 1.800 | 1.803 | −0.166 |
| 0.008 | 2.880 | 2.885 | −0.173 |

TABLE 1-continued

Measurement results of the angular velocity by using the monocular vision-based method and the circular grating method

| Frequency | Monocular vision method (°/s) | Circular grating method (°/s) | Relative deviation (%) |
|---|---|---|---|
| 0.01 | 3.600 | 3.595 | 0.139 |
| 0.02 | 7.200 | 7.208 | −0.111 |
| 0.05 | 18.00 | 18.045 | −0.249 |
| 0.08 | 28.80 | 28.775 | 0.087 |
| 0.10 | 36.00 | 36.098 | −0.271 |
| 0.20 | 72.00 | 72.175 | −0.242 |
| 0.50 | 180.0 | 180.326 | −0.181 |
| 0.80 | 288.0 | 287.521 | 0.167 |
| 1.00 | 360.0 | 360.884 | −0.246 |
| 2.00 | 720.0 | 718.305 | 0.236 |
| 5.00 | 1800 | 1805.135 | −0.285 |
| 8.00 | 2880 | 2888.359 | −0.289 |
| 10.0 | 3600 | 3610.238 | −0.284 |

The measurement results of the angular acceleration obtained by the method provided herein and the circular grating method in the frequency range of 0.001~10 Hz are shown in Table 2. The measurement results obtained by the method provided herein are highly matched with those obtained by the circular grating method, and the maximum relative deviation within the whole frequency range is less than 0.2%.

TABLE 2

Measurement results of the angular acceleration by using the monocular vision-based method and the circular grating method

| Frequency | Monocular vision method (°/s) | Circular grating method (°/s) | Relative deviation (%) |
|---|---|---|---|
| 0.001 | 0.0002 | 0.0002 | 0.080 |
| 0.002 | 0.0008 | 0.0008 | 0.060 |
| 0.005 | 0.005 | 0.005 | 0.099 |
| 0.008 | 0.013 | 0.013 | 0.040 |
| 0.01 | 0.020 | 0.020 | 0.139 |
| 0.02 | 0.079 | 0.079 | 0.020 |
| 0.05 | 0.496 | 0.496 | 0.000 |
| 0.08 | 1.271 | 1.271 | −0.020 |
| 0.1 | 1.987 | 1.986 | 0.080 |
| 0.2 | 7.945 | 7.943 | 0.020 |
| 0.5 | 49.654 | 49.644 | 0.020 |
| 0.8 | 127.190 | 127.089 | 0.080 |
| 1 | 198.813 | 198.576 | 0.119 |
| 2 | 636.234 | 636.392 | −0.025 |
| 5 | 1982.804 | 1978.856 | 0.200 |
| 8 | 2529.145 | 2531.672 | −0.100 |
| 10 | 1974.316 | 1973.921 | 0.200 |

The above-mentioned embodiments are merely illustrative of the technical solutions of the present disclosure, and are not intended to limit the present disclosure. It should be understood that any optimization, improvement, and modification made by those skilled in the art without departing from the spirit and scope of the disclosure should fall within the scope of the present disclosure defined by the appended claims.

What is claimed is:

1. A method for measuring angular velocity and angular acceleration based on monocular vision, comprising:
   (S1) fixing a feature mark on a working table of a rotary motion generating device; and acquiring, by an acquisition and imaging device, a movement sequence image of the feature mark; wherein the feature mark is composed of a straight line and four circles therearound; and a rotation characteristic of the feature mark are consistent with that of the working table of the rotary motion generating device;
   (S2) determining a region of interest on the movement sequence image of the feature mark by template matching, wherein the region of interest is formed by centers of the four circles of the feature mark; selecting a set of circular templates with different sizes; and subjecting the set of circular templates and the movement sequence image of the feature mark to cyclic matching to determine the region of interest on the movement sequence image of the feature mark acquired under different shooting distances and rotation conditions;
   (S3) extracting all feature line edges in the region of interest; retaining coordinates of points at feature line edges in a motion direction via a constraint of the number of edge points; and acquiring a corresponding edge line by using a least square method to fit retained edge coordinates; and
   (S4) calculating an angular velocity and angular acceleration of a rotary motion through the corresponding fitted edge line; and saving and displaying calculation results.

2. The method of claim 1, wherein the region of interest on the movement sequence image of the feature mark is determined through steps of:
   selecting the set of circular templates with different sizes; and calculating a correlation coefficient $R_i(x,y)$ to achieve matching between the set of circular templates and the circular regions on the movement sequence image of the feature mark; wherein the movement sequence image of the feature mark is expressed as $\{F_j(x,y), j=1, 2, \ldots, N\}$; the set of circular templates is expressed as $\{T_i(u,v), i=1, 2, \ldots, S\}$; and the correlation coefficient $R_i(x,y)$ is calculated as follows:

$$R_i(x, y) = \frac{\sum_{u=1}^{R}\sum_{v=1}^{C}[F_j(x+u, y+v) - \overline{F}_j][T_i(u, v) - \overline{T}_i]}{\sqrt{\sum_{u=1}^{R}\sum_{v=1}^{C}[F_j(x+u, y+v) - \overline{F}_j]^2 \sum_{u=1}^{R}\sum_{v=1}^{C}[T_i(u, v) - \overline{T}_i]^2}};$$

wherein j represents the number of frames; N represents the number of collected motion sequence images of the feature mark; S represents the number of circular templates; R and C represent row and column of $T_i(u,v)$, respectively; $\overline{F}_j$ and $\overline{T}_i$ are mean gray values of t $F_j(x,y)$ and $T_i(u,v)$, respectively; and
cyclic matching is performed between $T_i(u,v)$ and $F_j(x,y)$ to calculate the $R_i(x,y)$; a region with a maximum $R_i(x,y)$ on $F_j(x,y)$ is a matched circle; and four circles on $(x,y)$ are determined in sequence to determine the region of interest formed by centers of the four circles.

3. The method of claim 2, wherein a rectangular region in the region of interest on $F_j(x,y)$ is classified; a center of the rectangular region is expressed as follows:

$$\begin{cases} c_x = \frac{\sum_{k \in Region} G(k) \cdot x(k)}{\sum_{k \in Region} G(k)} \\ c_y = \frac{\sum_{k \in Region} G(k) \cdot y(k)}{\sum_{k \in Region} G(k)} \end{cases};$$

wherein G(k) is a gray value of pixel k in the rectangular region; x(k) and y(k) are horizontal and vertical coordinates of the pixel k, respectively; a direction angle of the rectangular region is set to be an angle of an eigenvector associated with a minimum eigenvalue of matrix M, expressed as follows:

$$M = \begin{bmatrix} m^{xx} & m^{xy} \\ m^{xy} & m^{yy} \end{bmatrix};$$

wherein:

$$\begin{cases} m^{xx} = \frac{\Sigma_{k \in Region} G(k) \cdot (x(k) - c_x)^2}{\Sigma_{k \in Region} G(k)} \\ m^{xx} = \frac{\Sigma_{k \in Region} G(k) \cdot (y(k) - c_y)^2}{\Sigma_{k \in Region} G(k)} \\ m^{xy} = \frac{\Sigma_{k \in Region} G(k) \cdot (x(k) - c_x)((y(k) - c_y))}{\Sigma_{k \in Region} G(k)} \end{cases};$$

a center line of the rectangular region is the feature line edge; coordinates of points at the line edge in a motion direction are retained via a constraint of the number of edge points; and line segment detection is performed N times to obtain coordinates $\{l_j(x,y)\}$ of points on the line edge of the movement sequence image $\{F_j(x,y)\}$.

4. The method of claim 3, wherein a fitted edge line $\{l_j\}$ of the $\{l_j(x,y)\}$ is obtained by least square-based linear fitting; an edge line $l_I$ of a $1^{st}$ frame image is selected as a reference zero, and an angle between an edge line $l_j$ of each of subsequent frame images and the edge line $l_I$ is calculated in sequence; an angular velocity of the rotary motion is calculated according to a ratio of a rotational angle to a rotation period within the rotation period, and the angular acceleration is obtained through steps of: calculating rotational angles under different acquisition moments; and obtaining a second derivative of the rotational angles with respect to time to obtain the angular acceleration.

5. An apparatus for implementing the method of claim 1, comprising:
the working table of the rotary motion generating device;
the feature mark;
a lighting device;
the acquisition and imaging device;
a fixing part;
an image transmission device; and
an image processing and displaying unit;
wherein the acquisition and imaging device is connected to the image transmission device; and the image transmission device is connected to the image processing and displaying unit; and
the working table of the rotary motion generating device is configured to produce a constant-speed or variable-speed rotary motion; the feature mark is fixedly arranged on the working table of the rotary motion generating device, such that the rotation characteristic of the feature mark is consistent with that of the working table of the rotary motion generating device; the lighting device is configured to provide light for the acquisition and imaging device; the fixing part is configured to fix the acquisition and imaging device to allow a light axis of the acquisition and imaging device to be perpendicular to the feature mark; the acquisition and imaging device is configured to collect the movement sequence image of the feature mark; the image transmission device is configured to transmit the movement sequence image of the feature mark acquired by the acquisition and imaging device; the image processing and displaying unit is configured to process the acquired movement sequence image of the feature mark, and save and display measurement results of the angular velocity and angular acceleration of the rotary motion of the feature mark.

* * * * *